C. M. MURCH.
Vehicle.
No. 218,637.   Patented Aug. 19, 1879.
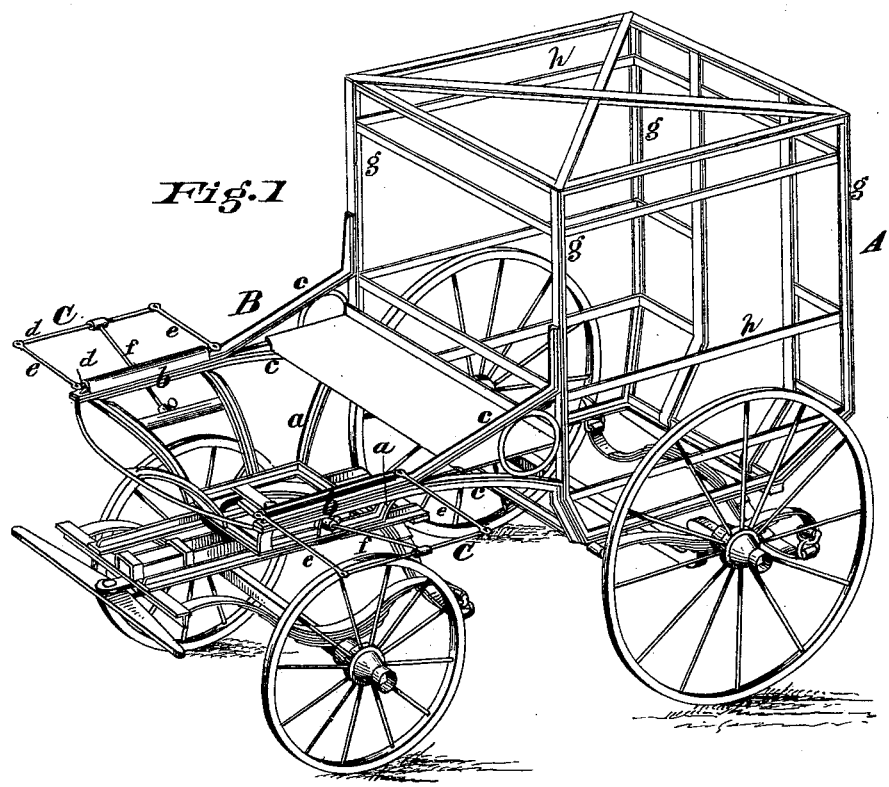

UNITED STATES PATENT OFFICE.

CHAUNCEY M. MURCH, OF CINCINNATI, OHIO.

IMPROVEMENT IN VEHICLES.

Specification forming part of Letters Patent No. 218,637, dated August 19, 1879; application filed July 7, 1879.

*To all whom it may concern:*

Be it known that I, CHAUNCEY M. MURCH, of Cincinnati, Ohio, have invented a new and useful Improvement in Vehicles, of which the following is a specification, reference being had to the accompanying drawings illustrating the same.

The object of my invention is to improve the construction of the body of the vehicle, whereby the advantages of strength, lightness, and economy of cost may be secured, and to combine therewith devices enhancing the convenience and utility of the vehicle; and it consists, first, in an improved construction of the vehicle-body proper, whereby all the advantages of a light, strong, durable, and cheap metal frame are secured; secondly, in an improved arrangement and disposition of the parts constituting what I have termed in previous patents the "suspending-frame;" and, thirdly, in the combination therewith of folding racks, for the more convenient disposition and carriage of baggage.

As a convenient illustration of my invention, showing a mode of carrying it into practical operation, I have shown in the drawings herewith the frame and running-gear of a cab for city use, in which—

Figure 1 is a perspective view, and Fig. 2 a detail edge view, of a panel, showing its adjustment to the metal frame.

In the illustrations, A denotes the body proper of the vehicle, and B the suspending-frame. The latter has the general contour of an inverted four-sided pyramid frustum, with curved sides and edges. Its frame-work is composed of bars of T-angle iron bent to the required form, with the elevated web inward, and rests upon the pivot-connection or fifth-wheel of the front axle.

The rear corner bars or braces, *a a*, extend rearward beneath the driver's seat, and are attached to the body proper, A, thus aiding to support and brace the suspending-frame from the main portion of the vehicle-body. The side horizontal bars, *b*, of the suspending frame are bifurcated at the rear, as shown at *c c*, and the ends of the branches *c c* are turned vertically upward and downward, so as to rest against and be secured to the corner uprights of the body A. Strengthening-rings are secured in the Vs thus formed, which also aid in giving a neat appearance to the vehicle.

The bifurcation of the side rails uniformly above and below the horizontal line and the arrangement of the supporting-braces, not only adds to the strength, but is a more convenient and economical construction than that shown in my former patents.

In the present case the suspending-frame is intended more especially for the carriage of baggage, such as trunks, and to increase its utility in this respect I attach to it one or more folding racks, C, constructed as follows: These consist each of two parallel braces or rods, *d d*, one of which is hinged to the upper rail of the suspending-frame. The bars *d d* are pivoted at their respective ends to parallel connecting-bars *e e*, which construction forms a rectangular frame capable of folding down sidewise. One or more supporting-bars, *f*, are hinged to the outer bars, *d*, and their free ends, when the rack is open and thrown out horizontally, rest in suitable socket-bearings provided on the outside of the suspending-frame, in which they may be secured by set-screws or other fastenings. When out of use the racks are folded down and turned inward, thus bringing the supporting-braces inside of the suspending-frame and out of the way. These racks may be attached both to the front and sides of the suspending-frame, and when extended outward form convenient platforms for baggage.

In the construction of the body proper, A, I use a frame built wholly of metal, in the form of T-angle bars, iron or steel being preferred, to which panels of wood or other material suitable therefor are attached, as hereinafter described.

The general character of the frame is fully shown in the drawings. It consists of four corner uprights, *g*, secured above and below to rectangular top and bottom pieces. These parts are formed of the T-angle bars, having the webs facing each other inwardly. The corner uprights of the frame are bent diagonally inward at the bottom, and the contracted bottom of the vehicle-body rests upon platform-springs between the wheels in the depressed portion of the axle, conveniently near the ground. Two angle-iron uprights, spaced suitably apart, form jambs for a rear door to the vehicle, and flat bars disposed horizontally connect the corner uprights and complete the frame.

In the frame thus constructed panels are secured in the recesses formed by the flange on the outside of the webs, and strengthening cross-bars *h* are secured in the recesses on the inner sides of the webs, which serve as additional points of attachment for the panels, as shown in Fig. 2.

The advantages of this construction are numerous and important. The frame is easily and cheaply constructed by the means and skill possessed by any ordinary blacksmith. The webs or flanges of the iron frame form secure side and end bearings for the panels, which may be fitted and secured in position by ordinary workmen, who need not be especially skilled in carriage-building. In case of injury to the panels, they may be easily taken out and replaced, while a permanent injury to the frame is practically impossible. The recesses or angles formed by the webs of the frame form guides also for the doors and windows of the vehicle, and also a secure support for the floor and roof. Thus all the labor and expense of mortising and adjusting a wooden frame are avoided, and a much lighter, stronger, more durable, and cheaper vehicle-body is secured. The improvement is applicable to vehicles of all kinds.

Having described my invention, I claim and desire to secure by Letters Patent—

1. A vehicle-body having the frames of its side walls composed of T-angle bars of metal, the ribs or webs of two of said bars in each frame being turned inwardly toward each other, and connected by strengthening-bars secured to their inner surfaces, while their outer surfaces are adapted to support panels, substantially as described.

2. In combination with the suspending-frame B of a vehicle-body, one or more folding baggage-racks, pivoted to said frame, and provided with adjustable supports, whereby they may be held in a horizontal position or folded with the frame out of the way, substantially as specified.

In testimony whereof I have hereunto set my hand this 24th day of June, A. D. 1879.

CHAUNCEY M. MURCH.

Witnesses:
L. M. HOSEA,
C. F. HESSER.